(12) United States Patent
Esteve Asensio et al.

(10) Patent No.: US 8,260,210 B2
(45) Date of Patent: Sep. 4, 2012

(54) DETECTING INTERFERENCE IN A WIRELESS COMMUNICATION SYSTEM

(75) Inventors: Guillermo Esteve Asensio, Madrid (ES); Francisco Javier Rubio Andres, Madrid (ES); Juan Jose Murillo Fuentes, Seville (ES); Pablo Martinez Olmos, Seville (ES)

(73) Assignee: Vodafone Group PLC, Newbury, Berkshire (GB)

( * ) Notice: Subject to any disclaimer, the term of this patent is extended or adjusted under 35 U.S.C. 154(b) by 176 days.

(21) Appl. No.: 12/698,050

(22) Filed: Feb. 1, 2010

(65) Prior Publication Data

US 2010/0279624 A1 Nov. 4, 2010

(30) Foreign Application Priority Data

Jan. 30, 2009 (ES) .................................. 200900277

(51) Int. Cl.
*H04B 17/00* (2006.01)
(52) U.S. Cl. .................. 455/67.11; 455/67.13; 455/423; 455/435.2; 455/456.1; 455/424; 455/434; 379/32.01; 379/1.01; 365/158
(58) Field of Classification Search ............... 455/423, 455/435.2, 456.1, 424, 434, 67.11, 67.13; 379/32.01, 1.01; 365/158
See application file for complete search history.

(56) References Cited

U.S. PATENT DOCUMENTS

| | | | | |
|---|---|---|---|---|
| 5,687,217 A | * | 11/1997 | Bliss et al. ................. | 455/423 |
| 6,684,061 B1 | | 1/2004 | Yost | |
| 7,398,052 B2 | * | 7/2008 | Spirito et al. ............... | 455/18 |
| 2002/0015393 A1 | | 2/2002 | Pan et al. | |
| 2002/0082004 A1 | | 6/2002 | Sakai | |
| 2005/0054312 A1 | * | 3/2005 | Spirito et al. ............... | 455/226.1 |
| 2005/0143011 A1 | | 6/2005 | Jacobsen | |

FOREIGN PATENT DOCUMENTS

| | | |
|---|---|---|
| EP | 1873925 | 1/2008 |
| ES | 2321256 | 6/2009 |
| WO | WO 99/44305 | 9/1999 |
| WO | WO 02/09312 | 1/2002 |
| WO | 2004/028184 | 4/2004 |
| WO | 2006/009547 | 9/2006 |
| WO | 2006099548 | 9/2006 |

* cited by examiner

*Primary Examiner* — April G Gonzales
(74) *Attorney, Agent, or Firm* — Workman Nydegger

(57) ABSTRACT

Method to determine the existence of interferences in a wireless communication link based on comparing the power received at both links of radio channel and the propagation losses calculated from both power and quality measurements, comprising:

(i) gathering values RXLEV_UL and RXLEV_DL;
(ii) using said values to estimate the receiver power level in the base station;
(iii) statistical analysis of the two different estimations obtained ($P_{RXLEV\,UL}^{i}$, and $\tilde{P}_{UL}^{i}$) for every connection i in the radio link;
(iv) comparing the estimations ($P_{RXLEV\,UL}^{i}$ and $\tilde{P}_{UL}^{i}$) of the uplink received signals strength with the quality parameters RXQUAL_UL and RXQUAL_DL;
(v) computing the behavior of the computed values $p_s^i$ and $R_{snri}$;
(vi) analyzing the results to detect:
  (a) steady-state abnormalities;
  (b) unbalanced interferences;
  (c) malfunctioning of the power control; and
  (d) inadequate radio planning.

6 Claims, 1 Drawing Sheet

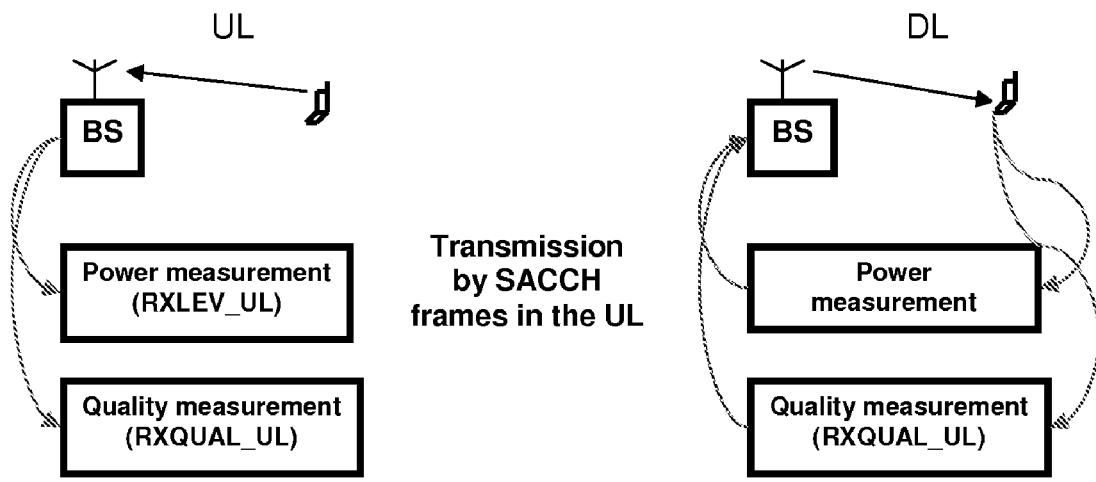

DETECTING INTERFERENCE IN A WIRELESS COMMUNICATION SYSTEM

CROSS-REFERENCES AND RELATED APPLICATIONS

This application claims the benefit of Spanish Patent Application No. ES 200900277, filed Jan. 30, 2009, entitled "Detecting Interference in a Wireless Communication System," which is incorporated herein by reference in its entirety.

FIELD

Embodiments of the invention relate to methods for detecting interference in a wireless communication system.

BACKGROUND

Some thieves cut the telephony wires to houses and uses inhibitors to disable any chance of the inhabitants to call for help using either a fixed of a mobile phone, even if they have an automated burglar alarm set with both possibilities. These assaults sometimes cause victims. The idea is to detect, using network measurements, the usage of inhibitors to issue an alert to burglar alarm's companies. Then they may poll to their customers' equipment under the coverage of the affected cell to check if the alarm is still operative.

The current alternative is to poll regularly the alarm sets to detect the continuity of the link. This service is offered as a plus by the Security Companies and it is priced highly, according with the costs of using so much transmission. For example, the patent application WO2004028184 Alarm arrangement at a mobile communication system, describes a system wherein each mobile terminal transmits signals regularly, randomly or when triggered by an event. The regularly or randomly transmitted signals are registered in the system's switching center. Where a signal is missing, information on the absence is, after logic analysis in the switching center, immediately and automatically transmitted to the alarm reception center.

The US patent application U.S. Pat. No. 5,687,217, describes a method and system for verifying that each remote cell unit in a cellular phone system is operational. The system and method in accordance with the invention use the receiver equipment of each cell unit to listen to or monitor transmissions by other cell units. Each cell unit is independently placed in a listen verification mode in which it measures communication quality of other cell units that it can hear. The selected cell unit reports the communication quality results to a master control unit. The master control unit stores the result information to allow a comparison of communication quality over time. If communication quality has degraded over time by a significant amount, the master control unit signals an alarm. In another aspect of the present invention, the listen verification mode can be used during installation of the cellular system to verify performance of the system and adjust the system for optimal performance.

The applications WO2006099548 and WO2006099547 describes an interference control in a wireless communication system wherein a first sector estimates interference observed from terminals in neighbor sectors and obtains an interference estimate. The first sector may generate an over-the-air (OTA) other-sector interference (OSI) report and/or an inter-sector (IS) OSI report based on the interference estimate. The first sector may send the IS OSI report to the neighbor sectors, receive IS OSI reports from the neighbor sectors, and regulate data transmissions for terminals in the first sector based on the received IS OSI reports. The first sector may control admission of terminals to the first sector, de-assign admitted terminals, schedule terminals in sector in a manner to reduce interference to the neighbor sectors, and/or assign the terminals in sector with traffic channels that cause less interference to the neighbor sectors. They are substantially different to the method proposed because they are based on the interchange of measurements by several base stations to perform advanced power control procedures.

SUMMARY

In a wireless communication system there will be at least two entities connected through radio waves, interchanging information between them. Embodiments of the present invention are directed to methods for determining if that radio link has interference, this is, unwanted radio signals that decreases or even impedes the normal exchange of information.

For the purposes of this document we will call base station, Base transceiver or BTS to one of them and mobile device, user device, mobile station or MS to the other. This way we define two types of devices that might be actually equal up to a differentiation between the radio paths or radio links.

The transmission of information from mobile devices to base stations will be called "uplink" path or "UL" and the reverse direction will be called "downlink" or "DL", disrespectfully which element is considered to act as each type.

Embodiments of the invention apply irrespective of the type of elements linked by the wireless radio communication. It is possible to have several of them, from both types, involved in the same radio link.

It is possible to perform several measurements on every radio path. We will refer to two of them, the measurement of power and the measurement of quality:

Power: this measurement is related with the physical signal strength of the radio waves, usually measured at the receiving end of the radio communication. There are many methods to perform this measurement and it will vary depending of the modulation in use and other factors. The specific method to obtain this measurement is not the goal of this invention. We will distinguish between the measurement of the power at the receiving end of the UL (RXLEV_UL since now) and at the other radio link (RXLEV_DL).

Quality: this measurement is related with the amount of erroneous data received at one end of the connection (or both). There are many methods to perform this measurement and it will vary depending of the codification in use and other factors. The specific method to obtain this measurement is not the goal of this invention. We will distinguish between the measurement at the receiving end of the UL (RXQUAL_UL since now) and at the other radio link (RXQUAL_DL)

The method to detect interferences in a wireless communication network is thus based on quality and power strength measurements in both directions of the radio link, known as uplink and downlink. The analytical model extracts from these measurements a non-evident ratio which is used to determine the existence of an interfering signal depending on statistical parameters of the aforementioned ratio. Additionally it is possible to use those statistical parameters to detect if the interference comes from other equipment related to the same communication network or if it is external to such network. Because this method does not use the amount of traffic being carried it is clearly not covered by the previous patent and it is considered more powerful than the previous one.

It can be concluded that the proposed method to analyze the power levels and quality measures in wireless cell systems helps to much better explain its behavior. Any steady state abnormality can be easily detected if the points power versus quality points gather around a point with high standard deviation or a point with different qualities. Overall, the tool allows detecting, among others, a fixed interference, a bad performance of the power control, a poor radio planning and a non-desired outer jamming. This novel interference analysis tool has not hardware requirements since it takes the signal strength and quality measures that are usually available in every wireless network, typically for control power processes.

Throughout the description and claims the word "comprise" and variations of the word, are not intended to exclude other technical features, additives, components, or steps. Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

BRIEF DESCRIPTION OF THE DRAWINGS

FIG. 1 shows a diagram of the working measurements.

PREFERRED EMBODIMENT OF THE INVENTION

The method to detect interferences in a wireless communication system is based on comparing the power received at both links of a radio channel and the propagation losses that we calculate from both the power and the quality measurements. As can be shown in FIG. 1 the base station (BTS) gathers quality and signal strength at the UL and each mobile station (MS) does the same for the DL and delivers the values to the BTS. The BTS knows the transmitted power in the UL, usually the BTS dictates the MS the power to be transmitted in the UL after some power control algorithm. The method object of the present invention comprises, at least, the following steps:

(i) a first step of gather, for each established connection, the values RXLEV_UL and RXLEV_DL;

(ii) a second step of estimating the receiver power level in the base station side using both of the previous values wherein said second step further comprising:

A first sub-step of providing a direct estimation due to the parameter RXLEV_UL.

A second sub-step of calculating the propagation losses in the DL and then assimilating them to the propagation losses in the UL due to the parameter RXLEV_DL.

Therefore is not possible to obtain two different estimations for the UL received power per user; this will enable the analysis of differences between them in following steps of the method.

The first sub-step comprises a UL Power signal estimation based on RXLEV_UL value. As it is a common agreement, it is used capitals for the variables in logarithmic values. Therefore, both $P_{RXLEV\_UL}^i$ and $p_{RXLEV\_UL}^i$ denote received power in the uplink in dBm and mW respectively.

The method start from the value RXLEV_UL(i), which refers to the power signal measurement by the base station for the i-th connection of a particular radio link (several connections may concur in a single radio link), therefore its value corresponds with its estimation.

The second sub-step comprises a DL power estimation based on the RXLEV_DL parameter and equivalent UL received power. The goal of this sub-step is to compare in some way the UL and DL power levels. Therefore it is analyzed the power level that will be received at the mobile device, i.e. the DL, if the transmitted power level was the same than in the UL. This variable is named as the equivalent received signal strength in the UL from the received signal strength in the DL.

The signal strength received by the connection I is then used, this is the parameter RXLEV_DL(i), and the transmission power at both ends of the radio link to make the desired estimation. At the base station there is information of the power transmitted in each connection in addition to the value of the received signal strength because the power control of the mobile is performed by the base station.

Therefore the following values are available for the connection number i of a radio channel:

$P_{RXLEV\_DL}^i$(dBm): DL measured signal strength
$P_{MS(i)}^{BTS}$: DL transmitted signal strength
$P_{BTS}^{MS(i)}$(dBm): UL transmitted signal strength And the following steps are taken:

Starting from the DL signal levels for transmission and reception, we will estimate the propagation losses for each user, $$L_{MS(i)}^{BTS}(dB)=P_{MS(i)}^{BTS}(dBm)-P_{RXLEV\_DL}^i(dBm) \quad (1)$$

Then we will assume the reciprocity of the radio channel using the losses estimated in the DL, equation (1), to estimate the propagation losses in the UL $$L_{BTS}^{MS(i)}(dB)=L_{MS(i)}^{BTS}(dB) \quad (2)$$

Finally we will estimate the equivalent received signal strength using the previous data, obtaining a value relative to the UL from data of the DL.

We define this value as $\tilde{P}_{UL}^i$ for connection number i as follows:

$$\tilde{P}_{UL}^i(dBm)=P_{BTS}^{MS(i)}(dBm)-L_{BTS}^{MS(i)}(dB) \quad (1)$$

The interpretation of equation (3) is the average UL signal strength received in the case that the propagation conditions of the UL were identical to the DL. This means that the calculated signal strength is the value measured if the MS were transmitting at the DL instead of the UL. This has an inherent lack of exactitude because the measurement of DL signal strength includes useful signal, noise plus interferences. Any interfering signal present in the DL but not in the UL will cause a divergence between the estimations by both methods, as we will later explain.

It is important to notice that a radio channel is always reciprocal in some factor; this means the propagation losses in both directions are practically equal for a small separation in frequency, time or other physical quantity. In case this factor can be appropriately estimated, it is logical to introduce it in this step to increase the accuracy of the method.

(iii) a third step wherein the result of Step 2 is a couple of sequences, for every connection i in the radio link, as follows:

$P_{RXLEV\_UL}^i$(dBm): The estimation of the received power strength in the UL, obtained solely from the measurements of the UL received signal strength.

$\tilde{P}_{UL}^i$(dBm): The estimation of the received power strength in the DL updated with the difference in the transmitted power between UL and DL. It is obtained only from the measurements of the DL received signal strength. No information about UL performance is used except the MS transmitted power.

Once we get both sequences we will be interested in any statistical value derived from them. We will use the average sequence of both of them and their standard deviation. These values are defined as follows:

Sequence of the estimation of the average received power level in the UL per connection. It is the arithmetic average of the two estimations made for the UL received power level at connection number i.

$$p_\mu^i = \frac{1}{2}(\tilde{p}_{UL}^i + p_{RXLEV\_UL}^i) \quad (2)$$

$$i = 0, L, 7$$

$$p_\mu^i(dBm) = 10\log_{10}(p_\mu^i)$$

Sequence of the estimation of the standard deviation of the estimations of the received power levels in the UL per connection. It represents the difference between the two estimations respect to the average value:

$$p_s^i = \frac{1}{\sqrt{2}}\sqrt{(\tilde{p}_{UL}^i - p_\mu^i)^2 + (p_{RXLEV\_UL}^i - p_\mu^i)^2} \quad (3)$$

$$i = 0, L, 7$$

(iv) a fourth step of using the quality parameters RXQUAL_UL and RXQUAL_DL to further study and determine the causes of the differences between the estimations of the UL received signal strength made at the second steps ($P_{RXLEV\_UL}^i$ and $\tilde{P}_{UL}^i$) as follows:
  a first sub-step of generation an estimation of the Signal-to-Noise and Interference ratio (SNIR) from the quality parameters.
  a second sub-step of analyzing the previous results.

The first sub-step, as mentioned earlier, the quality parameter is just the synthesis in a single number of the bit error rate (BER) for each user before the channel decoding stage. It is calculated after the effect of the channel equalizer, which ideally eliminates the channel effects, and after the demodulator but before the channel decoding stage. Assuming an ideal channel equalizer the BER can be approximated by several means depending on the Modulation and coding schemes in use.

For instance, for the GMSK modulation in a channel with Gaussian noise of power level $N_0$ with an indeterminate level of interference and considering an enough number of interference sources, it can be taken the logical assumption that the noise is Gaussian white for the channel bandwidth with spectral power density $I_{XX}$ where XX=UL or XX=DL, although it is conditioned to the power control process of the system. So for this case it can be approximated the BER expression as:

$$RX\_QUAL\_XX \equiv BER_{RXQUAL\_XX} \approx \frac{1}{2}\mathrm{erfc}\left(\frac{d\min_{XX}}{2\sqrt{(N_{0,XX} + I_{XX})}}\right) \quad (4)$$

$$\Rightarrow \frac{d\min_{XX}}{2\sqrt{(N_{0,XX} + I_{XX})}} = \mathrm{erfc}^{-1}(2 \times BER_{RXQUAL\_XX})$$

Where erfc is the complementary error function and the parameter dmin is related with the energy per bit $E_b$ and with the product of the bandwidth of the Gaussian filter and the symbol period.

When BT=0.3, as used in the GSM standard, the value for the division $$\frac{d\min_{XX}^2}{2E_{b,XX}} = f(BT = 0.3)$$

is approximately 1.8. For other communication systems there are other expressions and similar approximations.

Assuming that the interference behaves as additive Gaussian noise with a spectral power density I, the final definition of the signal-to-noise-and-interference ratio $snir_{XX}$ is as follows:

$$snir_{XX} = \frac{E_{b,XX}}{N_{0,XX} + I_{XX}} \quad (7)$$

It can be shown now that it is possible to make an estimation of the $snir_{XX}$ from the values of the parameters RXQUAL_XX. This is valid for both links, uplink and downlink:

$$(\mathrm{erfc}^{-1}(2 \times BER_{RXQUAL\_XX}))^2 = \left(\frac{d\min_{XX}}{2\sqrt{(N_{0,XX} + I_{XX})}}\right)^2 \quad (8)$$

$$= \frac{d\min_{XX}^2}{4\sqrt{(N_{0,XX} + I_{XX})}}$$

$$= \frac{E_b^{XX} f(BT = 0.3)}{2(N_{0,XX} + I_{UL})}$$

$$\Rightarrow snir_{XX} = \frac{2 \times (\mathrm{erfc}^{-1}(2 \times BER_{RXQUAL\_XX}))^2}{f(BT = 0.3)}$$

$$= \frac{E_b^{XX}}{(N_{0,XX} + I_{XX})}$$

$$SNIR_{XX} = 10 \times \log(snir_{XX})$$

If finally, it is defined RXQUAL_XX(i) i=0, L, 7 as the estimated quality parameter for connection number i of a radio channel, it is possible to see how to estimate the associated $snir_{XX}(i)$. Once we have calculated the parameter $snir_{XX}(i)$ for both uplink and downlink, it is interesting for us to compare them. Significant differences between them provide us with important information about the radio environment.

In the second sub-step the comparison between the $snir_{XX}$ estimated for UL ($snir_{UL}$) and the one for DL ($snir_{DL}$) provides information about the noise and the interference on each path.

The comparison parameter, $R_{snir}$, is defined as follows:

$$R_{snir} = \frac{snir_{DL}}{snir_{UL}} = \frac{E_b^{DL}/(N_{0,UL} + I_{DL})}{E_b^{UL}/(N_{0,DL} + I_{UL})} \quad (9)$$

$$\Rightarrow R_{snir} = \frac{snir_{DL}}{snir_{UL}} \propto \frac{(N_{0,DL} + I_{UL})}{(N_{0,UL} + I_{DL})}$$

(v) a fifth step of jointly analyzing the behavior of $p_s^i$ and $R_{snri}$ computed in equation number (5) and (9) respectively. In particular, A first sub-step of generating a representation of parameter $p_s^i$ versus $R_{snri}$ for a connection, or a set of connections, within a time period.

A second sub-step of classifying the points in the representation into three groups: $R_{snri}=1$, $R_{snri}>1$, $R_{snri}<1$.

A third sub-step of studying the points out of the group $R_{snri}=1$.

A fourth sub-step of studying the density of points in the line $R_{snri}=1$.

(vi) a sixth step of analyzing the results of the fifth step to draw some conclusions on the following points:

Steady-state abnormalities: they can be easily detected if the power versus quality points gather around a point with a high standard deviation, $p_s^i$, or a point with different qualities.

Unbalanced interferences: the distributions of the points in the $p_s^i$ versus $R_{snri}$ representation explain the presence of unbalanced interferences, i.e. different interference levels in the UL and the DL. One the one hand these interferences usually present quick fluctuations compared to the update period of the power control algorithm, hence we have a vast number of points out of the line $R_{snri}=1$. This conclusion derives from the fact that the measurements of the received signal are composed of useful signal noise and interference:

$$P_{RXLEV\_UL(i)}(\text{dBm}) = P_{RXLEV\_UL(i)}(\text{dBm}) + P_{RXLEV\_UL(i)}^{noise}(\text{dBm}) + P_{RXLEV\_UL(i)}^{I_{UL}}(\text{dBm})$$

$$P_{RXLEV\_DL(i)}(\text{dBm}) = P_{RXLEV\_DL(i)}(\text{dBm}) + P_{RXLEV\_DL(i)}^{noise}(\text{dBm}) + P_{RXLEV\_DL(i)}^{I_{DL}} \quad (10)$$

where we have separated the power strength received in the UL and the DL as an addition of a term of useful signal $P_{RXLEV\_XX(i)}$, noise $P_{RXLEV\_XX(i)}^{noise}$, and interference $P_{RXLEV\_XX(i)}^{I_{xx}}$. If $P_{RXLEV\_DL(i)}^{I_{DL}}(\text{dBm}) \gg P_{RXLEV\_UL(i)}^{I_{UL}}(\text{dBm})$ the losses estimation in the DL, obtained using equation (1), depends on the high level of interference, therefore the estimation diverges from the UL actual propagation losses, with a lower level of interference. On the other hand, even if the power control latency is short and this difference is rapidly compensated, we have points with quite different $p_o^i$ values.

Therefore, we can find a high $p_s^i$ value while $R_{snri}$ is closed to the unity due the action of power control in the link with higher interference level since the power control processes seeks an acceptable similar quality level in both links.

Malfunctioning of the power control: a large concentration of points out of the line $R_{snri}=1$ also may be a result of a poor performance of the power control method.

Inadequate radio planning: A recurrent unbalanced and time variant interference can be detected with this method. This interference can be caused by other radio links within the same system. This takes places if a poor radio planning of the cellular system was performed or some further radio optimization is needed.

The invention claimed is:

1. A method to determine the existence of interferences in a wireless communication link based on comparing the power received at both links of radio channel and the propagation losses calculated from both power and quality measurements, the method comprising the following steps:
(i) a first step of gathering, for each established connection, the values RXLEV_UL and RXLEV_DL;
(ii) a second step of using independently the values RXLEV_UL and RXLEV_DL to estimate the receiver power level in the base station and, therefore, obtaining two different estimations for the uplink received power per user, wherein said two different estimations are denoted as:

$P_{RXLEV\_UL}^i$ which is the estimation of the received power strength in the UL that is obtained solely from the measurements of the UL received signal strength; and $\tilde{P}_{UL}^i$ it which is the estimation of the received power strength in the DL updated with the difference in the transmitted power between UL and DL that is obtained only from the measurements of the DL received signal strength;

(iii) a third step of statistical analysis of the two different estimations obtained in the second step ($P_{RXLEV\_UL}^i$ and $\tilde{P}_{UL}^i$) for every connection i in the radio link;

(iv) a fourth step of comparing the estimations ($P_{RXLEV\_UL}^i$ and $\tilde{P}_{UL}^i$) of the uplink received signals strength made at the second step with the quality parameters RXQUAL_UL and RXQUAL_DL;

(v) a fifth step of computing the behaviour of the values $p_s^i$ and $R_{snri}$ computed in the fourth step, said values being defined as:

$p_s^i$ which is the sequence of the estimation of the standard deviation of the estimations of the received power levels in the UL per connection, and represents the difference between the two estimations respect to the average value; and $R_{snri}$ which is the comparison ratio between the signal noise interference ratio for uplink and downlink;

(vi) a sixth step of analyzing the results of the fifth step configured to detect, at least, the following points:
(a) steady-state abnormalities if the power versus quality points gather around a point with a high standard deviation, or a point with different qualities;
(b) unbalanced interferences, wherein the distributions of the points in the high standard deviation versus $R_{snri}$ representation explain the presence of unbalanced interferences;
(c) malfunctioning of the power control: a large concentration of points out of the line $R_{snri}=1$ also may be a result of a poor performance of the power control method; and
(d) inadequate radio planning: a recurrent unbalanced and time variant interference caused by other radio links within the same system.

2. The method according to claim 1 wherein the second step further comprises a first sub-step of providing a direct estimation due to the parameter RXLEV_UL, and a second sub-step of calculating the propagation losses in the DL and then assimilating them to the propagation losses in the UL due to the parameter RXLEV_DL.

3. The method according to claim 2 wherein the first sub-step of the second step further comprises a UL power signal estimation based on RXLEV_UL value, starting from the value RXLEV_UL(i), which refers to the power signal measurement by the base station for the i-th connection of a particular radio link.

4. The method according to claim 2 wherein the second sub-step comprises a DL power estimation based on the RXLEV_DL parameter and equivalent UL received power and, therefore it is analyzed the power level that will be received at the mobile device; the signal strength received by the connection i is then used, this is the parameter RXLEV_DL(i), and the transmission power at both ends of the radio link to make the desired estimation; at the base station there is information of the power transmitted in each connection in addition to the value of the received signal strength because the power control of the mobile is performed by the base station; the following values are available for the connection number i of a radio channel:

$P_{RXLEV\_DL}^{i}$(dBm): DL measured signal strength
$P_{MS(i)}^{BTS}$(dBm): DL transmitted signal strength
$P_{BTS}^{MS(i)}$(dBm): UL transmitted signal strength and it further comprises the following steps:

starting from the DL signal levels for transmission and reception, we will estimate the propagation losses for each user, $$L_{MS(i)}^{BTS}(dB) = P_{MS(i)}^{BTS}(dBm) - P_{RXLEV\_DL}^{i} \quad (7)$$

then it is assumed the reciprocity of the radio channel using the losses estimated in the DL, equation (1), to estimate the propagation losses in the UL $$L_{BTS}^{MS(i)}(dB) = L_{MS(i)}^{BTS}(dB) \quad (8)$$

finally it is estimated the equivalent received signal strength using the previous data, obtaining a value relative to the UL from data of the DL, defining this value as $\tilde{P}_{UL}^{i}$ for connection number i as follows:

$$\tilde{P}_{UL}^{i}(dBm) = P_{BTS}^{MS(i)}(dBm) - L_{BTS}^{MS(i)}(dB) \quad (9)$$

wherein said equation (3) is the average UL signal strength received in the case that the propagation conditions of the UL were identical to the DL.

5. The method according to claim 1 wherein the third step of statistical analysis uses the average sequence of $P_{RXLEV\_UL}^{i}$ and $\tilde{P}_{UL}^{i}$ and their standard deviation, and wherein this values as defined as:

the sequence of the estimation of the average received power level in the UL per connection, that is the arithmetic average of the two estimations made for the UL received power level at connection number i:

$$p_{\mu}^{i} = \frac{1}{2}(\tilde{p}_{UL}^{i} + p_{RXLEV\_UL}^{i}) \quad i = 0, L, 7 \quad (10)$$
$$P_{\mu}^{i}(dBm) = 10\log_{10}(p_{\mu}^{i})$$

the sequence of the estimation of the standard deviation of the estimations of the received power levels in the UL per connection, representing the difference between the two estimations respect to the average value:

$$p_{s}^{i} = \frac{1}{\sqrt{2}}\sqrt{(\tilde{p}_{UL}^{i} - p_{\mu}^{i})^{2} + (p_{RXLEV\_UL}^{i} - p_{\mu}^{i})^{2}} \quad i = 0, L, 7 \quad (11)$$

6. The method according to claim 1 wherein the fourth step further comprises, at least, a first sub-step of generation an estimation of the Signal-to-Noise and Interference ratio (SNIR) from the quality parameters; and a second sub-step of analyzing the previous results defining a comparison parameter $R_{snri}$ the Signal-to-Noise Interference ratio for uplink and downlink providing information about the noise and the interference on each path.

* * * * *